(12) United States Patent
Bursik et al.

(10) Patent No.: US 12,299,438 B2
(45) Date of Patent: May 13, 2025

(54) KERNELS AS A SERVICE

(71) Applicant: Target Brands, Inc., Minneapolis, MN (US)

(72) Inventors: Jeffrey Jacob Bursik, Farmington, MN (US); Matthew Robert Jesser, Minnetonka, MN (US); Sam William Bloomquist, Minneapolis, MN (US); Nathan Ryan Solas, St. Paul, MN (US); Debashis Ghosh, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 167 days.

(21) Appl. No.: 18/099,780

(22) Filed: Jan. 20, 2023

(65) Prior Publication Data

US 2023/0229438 A1    Jul. 20, 2023

Related U.S. Application Data

(60) Provisional application No. 63/301,219, filed on Jan. 20, 2022.

(51) Int. Cl.
| | | |
|---|---|---|
| *H04L 9/32* | (2006.01) | |
| *G06F 8/34* | (2018.01) | |
| *G06F 8/71* | (2018.01) | |
| *G06F 11/28* | (2006.01) | |
| *G06F 11/30* | (2006.01) | |
| *G06F 11/36* | (2006.01) | |

(52) U.S. Cl.
CPC . *G06F 8/71* (2013.01); *G06F 8/34* (2013.01)

(58) Field of Classification Search
CPC ..... G06F 8/71; G06F 8/34; G06F 8/33; G06F 8/36
See application file for complete search history.

(56) References Cited

U.S. PATENT DOCUMENTS

| | | | |
|---|---|---|---|
| 9,904,527 B1* | 2/2018 | Miller | G06F 8/71 |
| 11,881,112 B1* | 1/2024 | Canavor | G08G 1/096725 |
| 2007/0073978 A1* | 3/2007 | Lee | G06F 11/1417 |
| | | | 714/E11.135 |
| 2018/0015829 A1* | 1/2018 | Braun | B60K 35/10 |
| 2021/0158463 A1* | 5/2021 | Madl | G06Q 20/405 |
| 2022/0283928 A1* | 9/2022 | Liu | G06F 11/3664 |
| 2022/0286294 A1* | 9/2022 | Grobler | H04L 9/3231 |
| 2022/0342710 A1* | 10/2022 | Vishnuswaroop Ramesh | |
| | | | G06F 9/5016 |
| 2022/0343137 A1* | 10/2022 | Surendran | G06N 3/063 |

(Continued)

OTHER PUBLICATIONS

Pemberton, Nathan et al., Kernel-as-a-Service: A Serverless Interface to GPUs (Abstract); Dated: Dec. 15, 2022; 18 Pages.

*Primary Examiner* — S. Sough
*Assistant Examiner* — Mohammad H Kabir
(74) *Attorney, Agent, or Firm* — Merchant & Gould P.C.

(57) ABSTRACT

In general, the subject matter of the present disclosure relates to a service for creating and executing software programs. For example, the disclosed service may include a service interface and an orchestrator. The service interface my receive input, including software code associated with a program or application. The orchestrator may, automatically based on an analysis of the code, or based on input from the user, send sections of the code to one or more kernels for execution under different execution environments.

19 Claims, 9 Drawing Sheets

(56) References Cited

U.S. PATENT DOCUMENTS

2022/0382868 A1* 12/2022 Itkin ........................ G06F 21/57
2023/0114636 A1*  4/2023 Pandurangan ...... G06F 11/3466
                                                        711/154
2023/0359455 A1* 11/2023 Jalal .......................... G06F 8/65

* cited by examiner

KERNELS AS A SERVICE

CROSS-REFERENCE TO RELATED APPLICATIONS

The present application claims priority from U.S. Provisional Patent Application No. 63/301,219, filed on Jan. 20, 2022, the disclosure of which is hereby incorporated by reference in its entirety.

BACKGROUND

Using data-driven analytics, many enterprises are trying to get more value out of their data. At the same time, the amount of available data is rapidly increasing. To meet the increasing quantity of data and sophistication of data use, data systems are becoming larger, more distributed, and more complex. Due to the volume and complexity of the data, deriving insights from the data is becoming increasingly difficult.

SUMMARY

Embodiments of the disclosure are directed to a system and method related to distributing code execution. In an example, the system may include an orchestrator that is communicatively coupled with a user program and with a plurality of execution environments. Among other things, the orchestrator may receive code from the user program and may send the code to a kernel of a selected execution environment. The kernel may execute the code and output data to the orchestrator, which may send the output data to the user program.

In a first embodiment, a system for distributing code execution is disclosed. The system comprises an orchestrator; and a user program communicatively coupled to the orchestrator; wherein the orchestrator comprises: a processor; and memory storing instructions that, when executed by the processor, cause the orchestrator to: receive code from the user program; receive, from the user program, a selected execution environment from a plurality of execution environments, the selected execution environment including a kernel for executing the code; transmit the code to the kernel for executing the code in the selected execution environment; receive output data from the kernel; and transmit the output data to the user program.

In a second embodiment, a method for distributing code execution is disclosed. The method comprises receiving one or more code sections from a software development program; receiving, from the software development program, one or more execution environments, each of the one or more execution environments including a kernel for code; transmitting, for each of the one or more code sections, the code section to a corresponding kernel for executing code of the code section in a selected execution environment of the plurality of execution environments; receiving output data from one or more kernels; and transmitting the output data to the software development program.

In a third embodiment, a non-transitory computer readable medium is disclosed. The non-transitory computer readable medium has instructions thereon, which when executed by a processor, cause the processor to distribute code execution by performing a method comprising: receiving code from a user program; receiving, from the user program, a selected execution environment from a plurality of execution environments, the selected execution environment including a kernel for executing the code; transmitting the code to the kernel for executing the code in the selected execution environment; receiving output data from the kernel; and transmit the output data to the user program.

DETAILED DESCRIPTION

Figure 1:
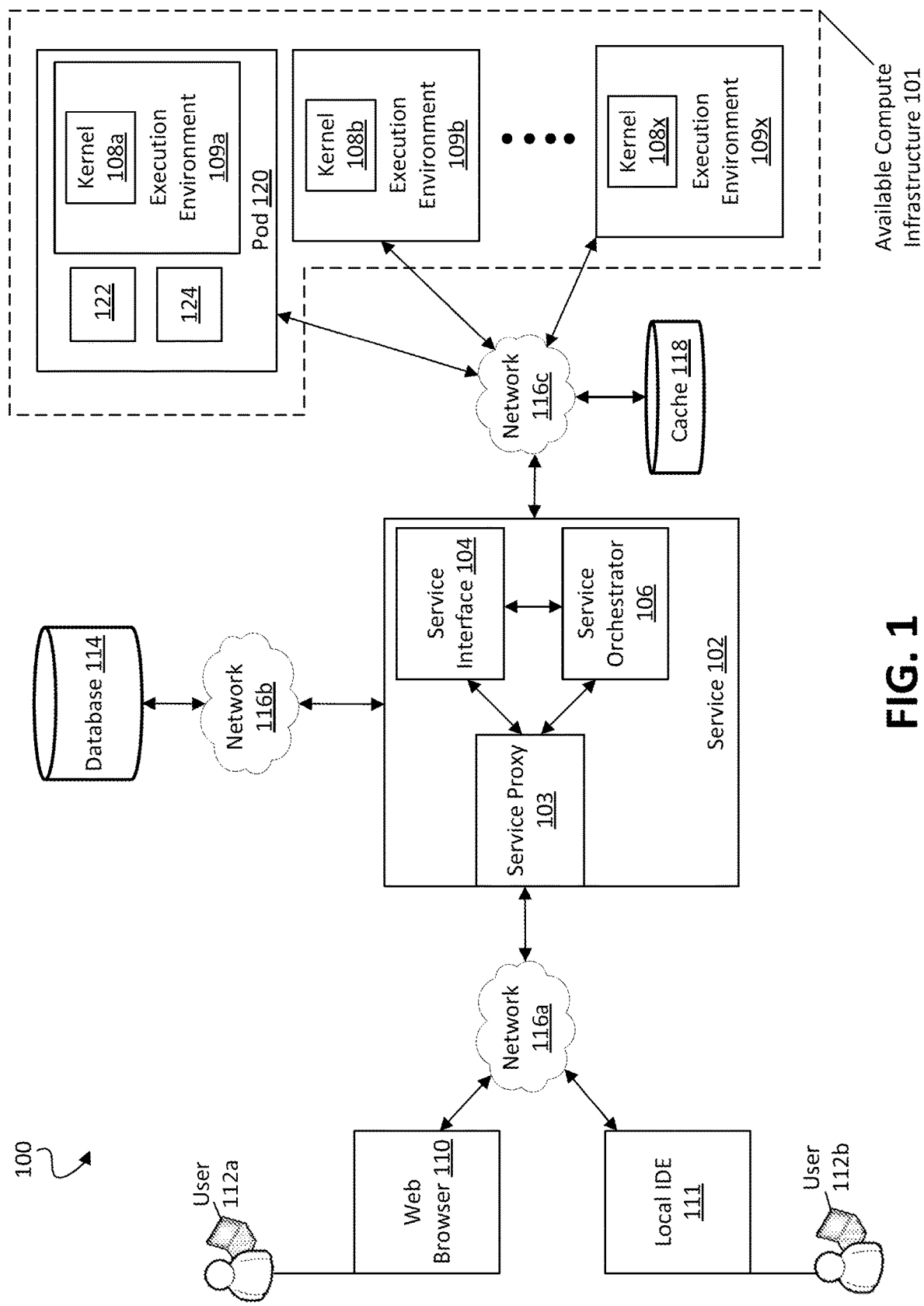
FIG. 1 illustrates a network in which aspects of the present disclosure can be implemented.

Enterprises may include data in disparate execution environments, spread across various cloud and physical servers, and stored in different types of databases. As data grows both in volume and complexity, the associated computational costs also grow. Because of the increased cost and complexity, integrating data into useful analytics programs has become more difficult, even as expectations grow for what insights and information data can deliver.

Another challenge in data analytics is that different users require different tools. For example, software developers may require tools for managing data; data scientists may require tools for analyzing data; and business analysts may require tools for visualizing data. Because these tools are often different, teams may not understand what other teams are doing, and there may be missed opportunities for collaboration. Furthermore, it may be challenging for a user to fully understand how data is used. That is, it can be difficult to see how a request to a database fetches data, how code manipulates the data, and how a visualization ends up depicting the data. Without this start-to-end visibility, it can be difficult to appreciate certain insights that data analytics may offer.

In example aspects, a user program, which can include a graphical user interface, such as an interface of an integrated development environment (IDE), or another type of interface, serves multiple purposes. Among other things, users can write software programs in the user program. For example, the user program can include software editing tools and a plurality of code input fields, each of which can receive a section of code. The sections of code can be written in different programming languages, and the user can specify an execution environment in which each section of code is to be executed. For example, if a user writes one code section using a library that must run in a certain environment to properly execute, or that requires data stored on a particular server, then the user can direct the code to that environment or server. At the same time, the user can specify that other sections of code be executed in other execution environments.

In general, the subject matter of the present disclosure relates to a service for creating and executing software programs in distributable execution environments. More specifically, the subject matter of the present disclosure relates to a service that includes a service interface and an orchestrator. Generally speaking, the service interface is a multi-purpose data analytics interface, and the orchestrator facilitates the execution of code written in the service interface across disparate execution environments selectable from the service interface.

Additionally, in example aspects, the service interface may be a web-based tool that a user may access via a web browser. In some examples, the service interface can include features for displaying data and communicating about code or data. For example, the service interface can include code input fields and display of output of executed code. For example, if sections of code include instructions for performing operations on data and then graphing the data, the service interface can provide an output display region for a visualization of the graphed data, allowing a user to easily see, in one interface, a connection between the code and the visualization. Additionally, the service interface can include fields for input other than code, such as spaces for images or for text providing analysis or describing the code or visualization. By incorporating data, code, visualizations, comments, and other information, the service interface is an integrated and efficient tool useable by software developers, data scientists, and business analysts, and, as described below, it can also interact with a complex data system.

In example aspects, to execute code that is received, the service interface or another user program interacts with the orchestrator. For example, a user program, such as the service interface, can—in response to receiving an execute request—send code sections and other information to the orchestrator. The orchestrator can be communicatively connected to separate execution environments, e.g., coupled with a plurality of kernels, for example via Application Programming Interfaces (APIs) exposed by the kernels. The kernels are programs that execute code, and each kernel can be configured to execute a certain type of code. Each kernel can run in one of a plurality of execution environments, such as separate, containerized execution environments. The execution environments can include resources, such as certain hardware, software, and databases, and the resources in each execution environment can vary. The resources available to each kernel, therefore, can also vary.

In example aspects, the orchestrator, having received code sections from a user program, such as the service interface or an IDE, can send code sections to kernels. To select a kernel for a code section, the orchestrator can check which execution environment the code is intended to be executed in, as specified in the user program, or the orchestrator can use other data to select a kernel. Before sending a code section, however, the orchestrator can also resolve any dependencies between code sections, as is further described below. Furthermore, the orchestrator may determine whether the selected kernel and execution environment were previously used and, if so, whether there is any cached data or parameters related to the selected kernel and execution environment. In some instances, the orchestrator may provide such cached data or parameters to the selected kernel.

In example aspects, having sent one or more code sections to one or more kernels for execution, the orchestrator can receive output data from the kernels and synchronize the output data. For example, if a service interface may send three code sections to the orchestrator, each intended for a different execution environment, the orchestrator can, either sequentially or in parallel, send the three code sections to three kernels, receive three sets of output data, and then synchronize that output data. The way in which the output data is synchronized can depend on the embodiment and on the details of the code. The orchestrator may store the output data in a database, or the orchestrator may format the output data in a way specified by the service interface, such as by formatting it as a graphic representation of data. Next, the orchestrator can return the output data to the user program, which can then, for example, display it in an output field.

Certain embodiments of the present disclosure have technical features that make them particularly advantageous over existing tools. For example, a user program may combine a variety of advantageous technical features, including interoperability with a variety of software languages and libraries, fields to write code and to display outputs of code (e.g., graphs and visualizations), spaces for collaboration and for non-code text, and other features. Furthermore, a user program may be used to write a software program including sections of code to be executed in disparate execution environments. By combining these and other features, the user program provides a multi-purpose tool that is useable by different types of users, increases collaboration, and illustrates a more complete pipeline of stages in data analytics, thereby resulting in more accurate, collaborative, and efficient data analysis.

Further still, aspects of the present disclosure include an orchestrator that manages the execution of a program across different execution environments. By, for example, interfacing with a plurality of kernels, managing dependencies, daisy-chaining execution, persisting kernel memory, synchronizing results, and organizing output, among other things, the orchestrator can improve the ability of the service to interact with large, distributed, and complex data systems. Furthermore, the service, by using the orchestrator, can leverage the computing power and resources of disparate systems. Additionally, because the orchestrator performs complicated, behind-the-scenes tasks, the user program can be a user-friendly and versatile tool. As will be apparent, these are only some of the advantages offered by the invention of the present disclosure.

FIG. 1 illustrates an example system 100 in which aspects of the present disclosure can be implemented. The system 100 includes an available compute infrastructure 101, a service 102, a plurality of kernels 108a-x hosted within a plurality of distributable execution environments 109a-x, user programs (e.g., web browser 110 and local IDE 111), users 112a-b, a database 114, and a cache 118. The service 102 further includes a service proxy 103, service interface 104 and a service orchestrator 106. As shown, the web browser 110 and the local IDE 111 can be communicatively coupled with the service 102 via the network 116a; the database 114 can be communicatively coupled with the service 102 via the network 116b; and each of the service 102, the cache 118, and the kernels 108a-x may be communicatively coupled via the network 116c. In some examples, each of the networks 116a-c may be a wireless network. In some examples, one or more the networks 116a-c may be the internet. In some examples, one or more of the networks 116a-c may be a local area network.

In some embodiments, the service 102 is a software program that, among other things, receives code from a user program and that distributes the code for execution across the kernels 108a-x. The service 102 can interface with a user, manage the execution of the code across the kernels 108a-x, and synchronize the output of the kernels 108a-x. In some embodiments, aspects of the service 102 are deployed in a Kubernetes cluster having one or more containers. For example, in some embodiments, one or more components of the service 102, and one or more components of the service orchestrator 106 (which are further described below in connection with FIG. 4) may be a container or sidecar operating in a Kubernetes pod.

In the example shown, the service 102 includes a service proxy 103. The service proxy 103 may, in some embodiments, provide authentication services for users or programs that access aspects of the service 102. As a result, the service proxy 103 may provide a layer of security not only for components of the service 102 (e.g., the service interface 104 and service orchestrator 106) but also for downstream systems, such as the database 114, the cache 118, and the kernels 108a-x.

Furthermore, in the example shown, the service 102 includes a service interface 104. The service interface 104 is an example of a user program that may be used to write software code. The service interface 104 can, among other things, provide a multi-purpose user interface that can be used to write code, analyze data, display visualizations, and collaborate. Furthermore, in some examples, the service interface 104 may include one or more input fields for indicating an execution environment and kernel for executing the code. The service interface 104 is further described below.

In the example shown, the service 102 further includes the service orchestrator 106, which may be communicatively coupled with one or more of the service proxy 103 or the service interface 104. The service orchestrator 106, can, among other things, receive code and other information from a user program, manage the deployment of the kernels 108a-x, persist memory of the kernels 108-x, manage the distribution of code across the kernels 108a-x, receive and synchronize output data from the kernels 108a-x, and return output data to the user program. In some examples, the service orchestrator 106 may include a plurality of components, examples of which are illustrated and described below in connection with FIG. 4. In some embodiments, the service 102 comprises other components besides the service interface 104 and the service orchestrator 106, and these other components can perform some of the functions described herein in connection with the service interface 104 or the service orchestrator 106. In other embodiments, a distinction is not made between the service interface 104 and the service orchestrator 106, or they are instead implemented as other components.

In some embodiments, the service 102 is hosted on a web server and, in response to a request, can display the service interface 104 to a web browser (e.g., the web browser 110). In other embodiments, the service 102, or components of it (e.g., the service interface 104 or the service orchestrator 106) can be integrated into another program or exposed as an API. In some embodiments, the service 102 may be implemented using a Kubernetes cluster or other similar technology, and one or more of the execution environments 109a-x may containers of the Kubernetes cluster.

In some embodiments the service 102 can store data related to programs executed by the service 102 in the database 114. Furthermore, in some embodiments, the database 114 can be located within the service 102 and can be directly connected with the service interface 104 or the service orchestrator 106. In other embodiments, the database 114 can be communicatively connected to the service 102 via the network 116b. In some embodiments, the database 114 may provide a persistent file storage system that may be mounted or attached to the service 102.

The available compute infrastructure 101 may include infrastructures and resources available to the service 102 for executing code. In some embodiments, the available compute infrastructure may include cloud-based infrastructures and computer resources. The available compute infrastructure may include, for example, a plurality of heterogeneous infrastructure types, such as Linux-compatible central processing units (CPUs), Graphics Processing Units (GPUs), processing units configured into a Hadoop cluster, or other computing or supercomputing infrastructure arrangements. As shown in the example of FIG. 1, the kernels 108a-x and the execution environments 109a-x may, in some embodiments, may be deployed using, or may otherwise operate in connection with, the available compute infrastructure 101.

The kernels 108a-x can be programs that receive code, execute code, and return results of code. In some examples, each of the kernels 108a-x can be configured to handle code written in a particular programming language. Each of the kernels 108a-x can be part of a larger execution environment. Take, for example, the kernel 108a, which can be a program within an execution environment, such as execution environment 109a. The resources available to the kernel 108a can depend on the execution environment in which it resides. For example, the hardware, software, databases, and computing power available to the kernel 108a depend on the resources available in the execution environment 109a.

As illustrated, each of the kernels 108a-x can be in a different execution environment, meaning that some will have access to resources—such as particular software or hardware or databases—that others do not. In some examples, however, one or more of the kernels 108a-x can be in similar or in the same execution environments. In some embodiments, one or more of the kernels 108a-x can expose an API that can be accessed by other programs, such as the service 102. In some embodiments, the service orchestrator 106 may communicate with the kernels 108a-x to perform lifecycle management operations, such as starts, stops, pings, and so on. For some kernels, such operations may be performed via an API exposed by the kernels. For other kernels—such as kernels deployed in a common cloud-implemented cluster as the service 102—such lifecycle management operations may be performed via direct SSH (Secure Shell) with the kernels.

The execution environments 109a-x may differ based on the computing resources available within each environment. For example, a first execution environment may be a high-performance execution environment in which large volumes of real-time streaming data are to be processed. Another example execution environment may be constructed for execution on stored data in a large Hadoop database, for example by being integrated with and utilizing a distributed execution system such as Apache Spark. Another execution environment may be a cloud-hosted virtual machine that is deployed in a Kubernetes cluster that includes the service 102. Another type of execution environment can be Jupyter servers implemented within different execution environments, and one or more of the kernels 108a-x can be Jupyter kernels. Other types of disparate execution environments may be utilized as well. In some embodiments, new execution environments and kernels may be coupled to the service 102, and execution environments and kernels may be decoupled from the service 102.

In some embodiments, one or more of the execution environments 109a-x and the kernels 108a-x may be deployed as containers within another system, such as a Kubernetes pod, depending, for example, on the execution environment selected by a user. As an example, the service orchestrator 106 may deploy the pod 120 which may include the execution environment 109a and the kernel 108a. The service orchestrator 106 may also configure the pod 120 to include the containers 122 and 124, which may be systems that share resources with the kernel 108a. The containers 122 and 124 may, for example, be side-car containers. One or more of the containers 122, 124 may, for example, provide an authentication service, update service, lifecycle management service, or other service related to the pod 120, the service orchestrator 106, the kernel 108a, or the execution environment 109a.

The cache 118 may store data related to one or more of the kernels 108a-x or the execution environments 109a-x. In some embodiments, the cache 118 may store data related to previous states of the kernels 108a-x or the execution environments 109a-x. For example, the cache 118 may include data received or generated by a kernel of the kernels 108a-x during a previous execution or instance of the kernel, or the cache 118 may include one or more parameters that were previously used to configure a kernel or an execution environment. Using the cache 118, the service orchestrator 106 may, in some embodiments, persist kernel memory across subsequent kernel instances or executions.

A user program may be a software development program. The user program may be communicatively coupled to the service orchestrator 106. In some examples, the user program may be any one or more of the service interface 104, the web browser 110, the local IDE 111, or another program in which a user may develop software code and from which the user may send code to the service orchestrator 106 for execution. In some examples, the user 112a may use the web browser 110 to access the service 102 over the internet. In response to a request, the service 102 may provide the service interface 104 to the web browser 110, which may display the service interface 104 to the user 112a. In some embodiments, the web browser 110 may access a user program that is another web-based development program, such as Jupyter Lab, Jupyter Notebook, or RStudio. The web-based development program may, in some instances, be communicatively coupled to the service 102 or the service orchestrator 106 for code execution. The local IDE 111 may be an integrated development environment, such as IntelliJ, PyCharm, VS Code, or another integrated development environment. In some embodiments, the local IDE 111 may send code to the service 102 or the service orchestrator 106 for execution by one or more of the kernels 108a-x.

The user program may include a plurality of input fields, one or more of which may be for code and one or more of which may be for selecting an execution environment in which the code is to be executed. The selected execution environment may correspond with one of the execution environments 109a-x. Furthermore, the user program may include one or more input fields for selecting parameters or resources of the selected execution environment (e.g., an amount of memory available in the selected execution environment, a computing power available in the selected execution environment, software packages available in the execution environment, data available in the selected execution environment, etc.).

Figure 2A:
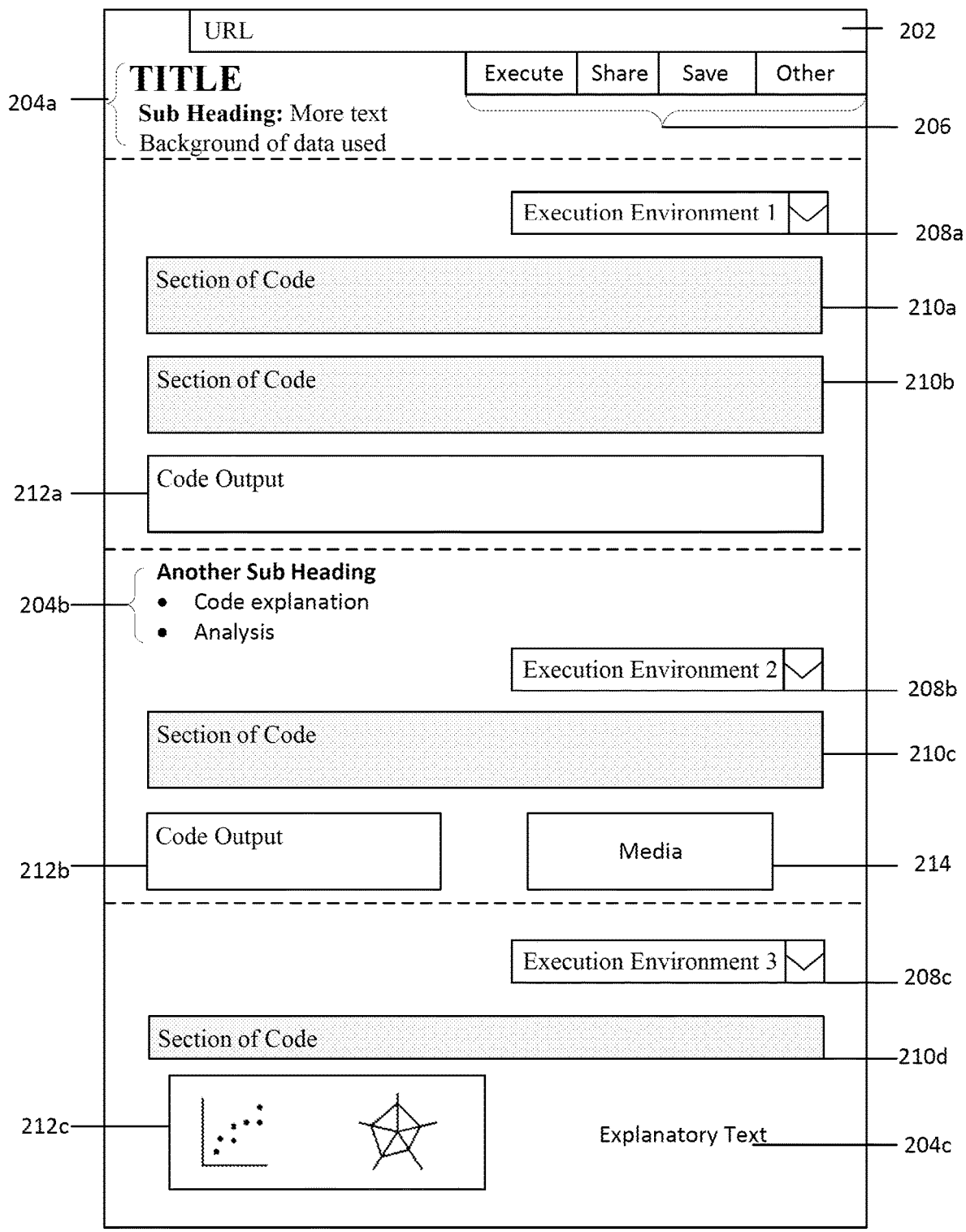
FIG. 2A illustrates an example interface of a user program

FIG. 2A illustrates an example interface of a user program. In the example of FIG. 2A, the example interface is described as the service interface 104, which may be accessed, in some embodiments, by the web browser 110. However, aspects of the interface described in FIG. 2A may also be part of other user programs, such as web-based development environments or the local IDE 111. As described above, the service interface 104 can be a multi-purpose graphical user interface for, among other things, interacting with and visualizing data. In the example of FIG. 2A, the service interface 104 comprises a URL 202, text fields 204a-c, options 206, execution environment selection fields 208a-c, code sections 210a-d, output fields 212a-c, and a media field 214. In other examples, the service interface 104 can comprise more or fewer components than those illustrated in FIG. 2. Furthermore, the relative positioning of the components can vary depending on the embodiment.

In some examples, the service interface 104 can be accessed via the URL 202. In other examples, the service interface 104 can be accessed through another program. In some examples, a user of the service interface 104 can input text into the text fields 204a-c; in other examples, the text fields 204a-c can include text stored in the service interface 104 or text that is automatically generated. The text fields 204a-c can include, for example, information related to a project, to other components of the service interface 104 (e.g., the code sections 210a-d or the output fields 212a-c), or to an analysis of aspects of a project or the service interface 104. In some examples, a user or the service interface 104 can insert an image, video, or other type of media into the media field 214. In some examples, a user of the service interface 104 can, by selecting one or more of the options 206, execute the code of the service interface 104, share or save the service interface 104, or perform another action.

As described above, a user can write and execute software by using the service 102. Each of the code sections 210a-d can include an input field for receiving code. In some embodiments, therefore, the user can write code using the plurality of code sections 210a-d. Each code section can contain as many lines of code as required by the user, and each code section can be written in a different programming language. In some embodiments, the service interface 104 can include tools to assist in writing code, such as general text editing tools and features designed to detect errors and make programming more efficient.

Furthermore, each section of code can be executed in a different execution environment. For example, referring to the example of FIG. 2A, a user can select that the code in code sections 210a-b be executed in a first execution environment, that the code in section 210c be executed in a second execution environment, and that the code in section 210d be executed in a third execution environment. To make these selections, the user can, in some embodiments, use the execution environment selection fields 208a-c. In some embodiments, each of the execution environment selection fields 208a-c may include a plurality of execution environment from which to select an execution environment for executing the corresponding code. The execution environment selection fields 208a-c may, for example, be a selectable drop-down list. Yet still, in some embodiments, the execution environment selection fields 208a-c may include other input fields for further defining an execution environment, such as input fields for selecting computing resources associated with a selected execution environment, an example of which is illustrated and described below in connection with FIG. 2B.

In some embodiments, the service 102 can automatically detect, based on the code itself and on other information, in which execution environment the code should be executed. As briefly described above, the execution environments in which code is executed can differ from one another. For example, they may include different hardware, software, or data, and they may be hosted by different entities, accessed in different ways, or located in different places. To execute code in one or more of the code sections 210a-d, a user can, for example, select the execute option of the options 206.

As further described below, the service interface 104 can, in response to receiving an execute request, transmit the code from one or more code sections 210*a-d* to the service orchestrator 106. The service orchestrator 106 may, among other things, manage execution of the code across distributed execution environments selected via the service interface 104. In some embodiments, once code has been executed, the service interface 104 can receive output from the executed code, and the output can be displayed, for example, in the output fields 212*a-c*. The output displayed in the output fields 212*a-c* can be, for example, text, images, figures, visualizations, or graphs, depending, for example, on the code of the code sections 210*a-d*. In some examples, the output data can be manipulated by a user of the service interface 104, and the user can markup the output data.

Figure 2B:
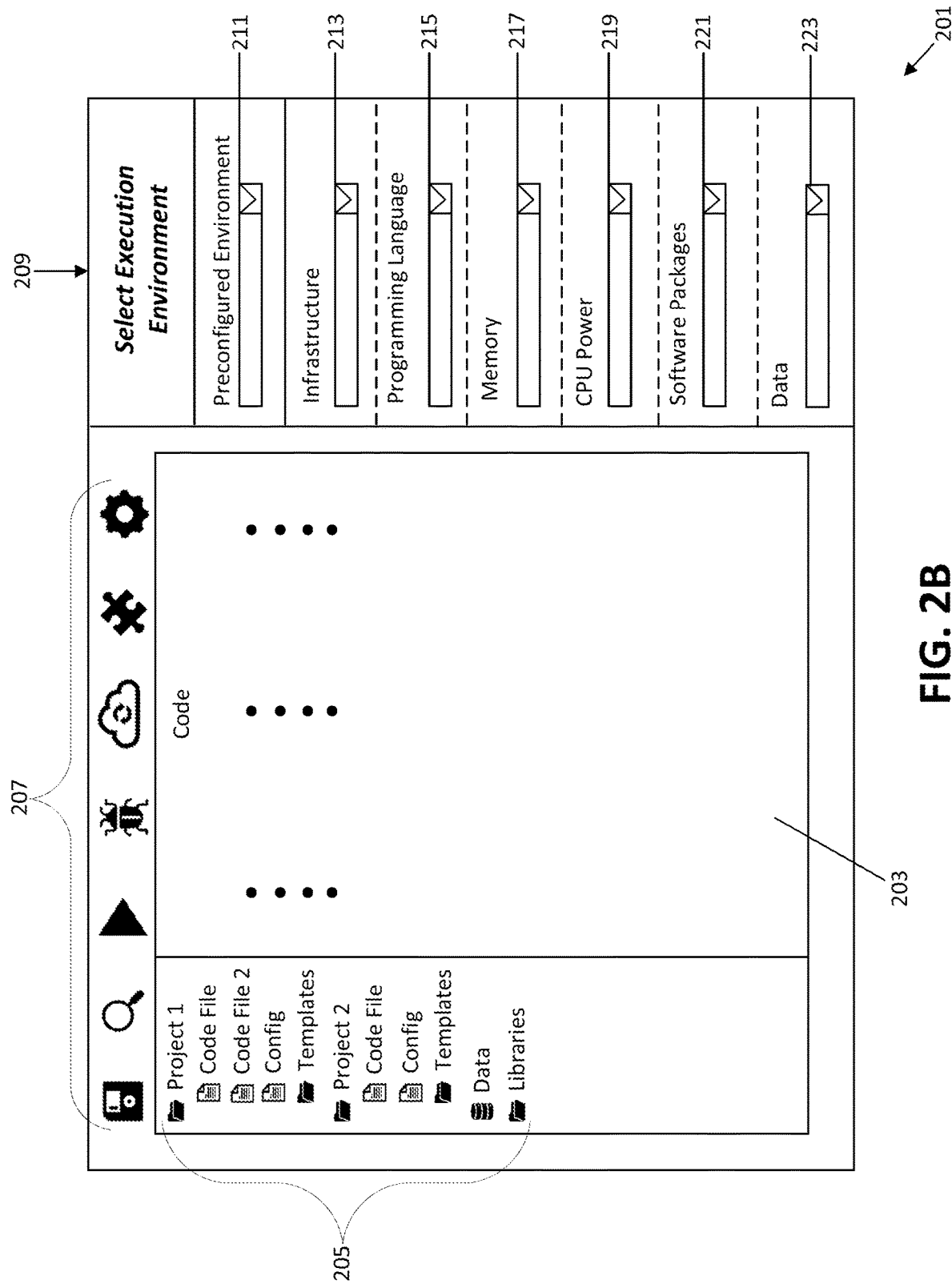
FIG. 2B illustrates an example interface of a user program

FIG. 2B illustrates another example interface of a user program. The user interface 201 may, for example, be part of a local IDE or a web-based IDE. The user program that displays the user interface 201 may be communicatively coupled to the service 102 or the service orchestrator 106. In the example shown, the user interface 201 includes a code input field 203, a project navigation region 205, options 207, and an execution environment selection region 209, which includes a plurality of input fields for defining an execution environment in which code of the code input field 203 is to be executed.

A user may use the code input field 203 for writing code and may use the project navigation region 205 for navigating across various projects, files, folders, databases, or other components of an IDE. The code input field 203 may, for example, correspond with one or more of the code files of the project navigation region 205. The options 207 may include a plurality of selectable actions that a user may initiate. For example, the options 207, may include, but are not limited to the following actions: saving, searching, executing, debugging, synching, managing plug-ins or extensions, and configuring settings. In some embodiments, one or more of the options 207 may be used to link the user program with the service 102.

In some embodiments, a user may use input fields of the execution environment selection region 209 to define an execution environment in which to execute code of the code input field 203. Although illustrated with the input fields 211-223 in the example of FIG. 2B, the user interface 201 may include more or fewer input fields than those shown. In some embodiments, one or more the input fields in the environment selection field 209 may include one or more of a drop-down list, a text input field, radio buttons, a check list, or another type of input field. In some embodiments, a user may use one or more of the input fields 211-223 to select a computer resource (e.g., memory, CPU power, software packages, data) for use in the selected execution environment.

The preconfigured environment selection field 211 may receive a selection of a preconfigured execution environment. A preconfigured execution environment may, in some instances, be a default execution environment that is provided by the service orchestrator 106. In some instances, a preconfigured execution environment may be a previous execution environment that was used by a user. In some embodiments, the user interface 201 may, in response to receiving a selection of a preconfigured execution environment, automatically fill out parameters of the preconfigured execution environment using one or more of the input fields 213-223. For example, a preconfigured execution environment (e.g., a default execution environment) may include a predefined infrastructure, a predefined programming language that its kernel can execute, and a predefined memory, CPU power, software packages, and data that is available in the preconfigured execution environment. In such a situation, one or more of the input fields 211-223 may be automatically populated in accordance with features of the selected predefined execution environment.

The infrastructure selection field 213 may include a plurality of infrastructures in which the selected execution environment may operate. In example embodiments, a user may select an infrastructure from among a plurality of heterogeneous infrastructure types, such as Linux-compatible central processing units (CPUs), Graphics Processing Units (GPUs), processing units configured into a Hadoop cluster, or other computing or supercomputing infrastructure arrangements. The programming language selection field 215 may include a plurality of programming languages associated with a plurality of kernels that may be communicatively coupled to the service orchestrator 106. The programming language may be, but is not limited to, Python, Java, or R. A user may, for example, select, via the programming language selection field 215, the programming language that corresponds with the code of the code input field 203. The memory selection field 217 may allow a user to define an amount of memory (e.g., RAM) available in the execution environment, thereby allowing a user to select an amount of memory that is needed by the program that the user wants to execute. The CPU power selection field 219 may allow a user to select an amount of processing power available to a kernel in the selected execution environment. The software packages selection field 221 may allow a user to select one or more software packages for use in the selected execution environment. The data selection field 223 may allow a user to select certain data sets for use in the selected execution environment.

Figure 3:
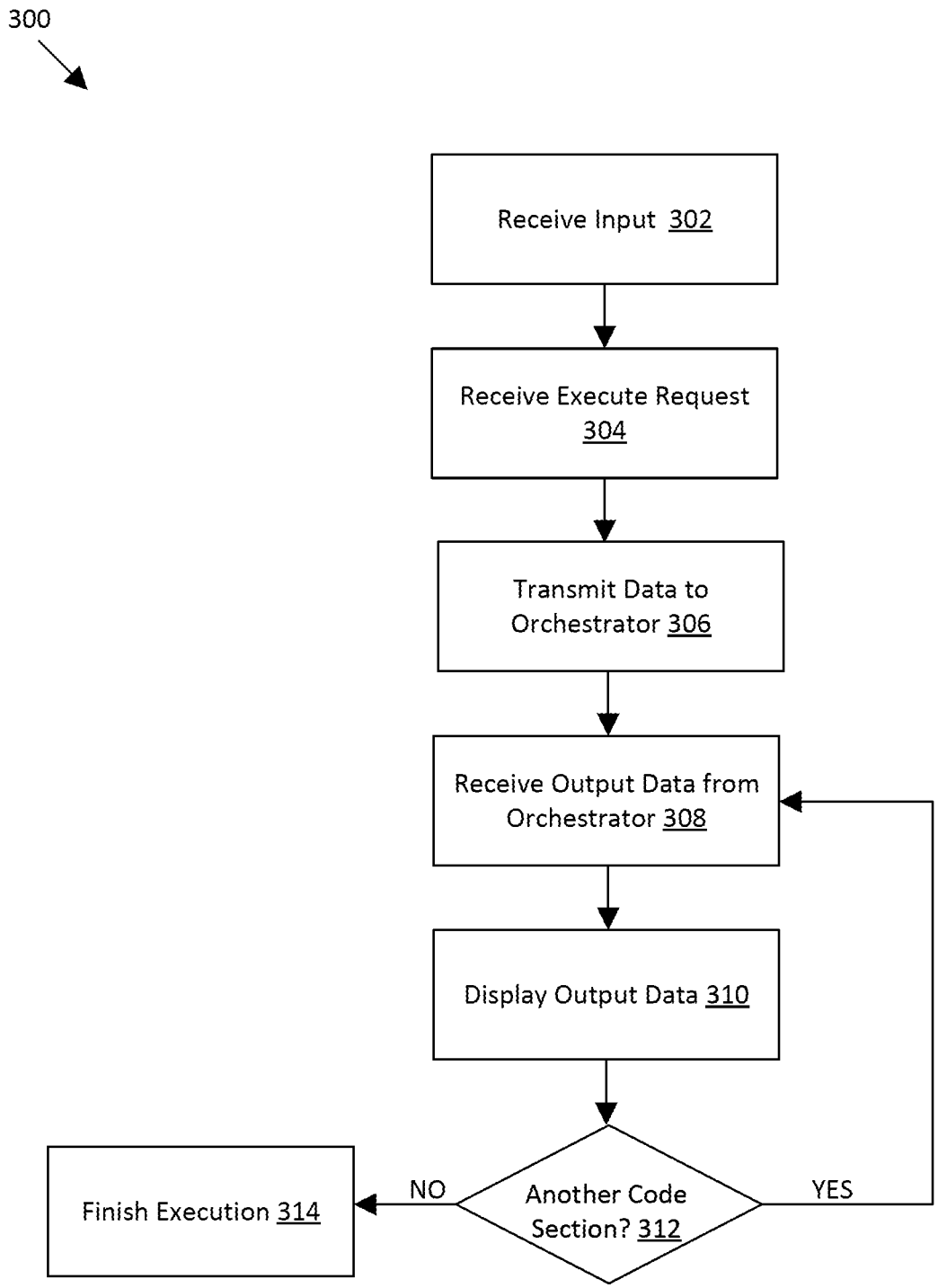
FIG. 3 is a flowchart of an example method.

FIG. 3 depicts an example method 300 that is useable, for example, by the service interface 104. Although described as being performed by the service interface 104, the method 300 may also, in some embodiments, be executed by other user programs, such as an IDE.

In the example operation 302, the service interface 104 may receive an input. For example, the input may include code, text, a selected execution environment, one or more parameters of the selected execution environment, such as computer resources available in the selected execution environment, or a selection of one or more other options.

In the example operation 304, the service interface 104 can receive an execution request. For example, a user of the service interface 104 can select an option to execute one or more sections of code. In some embodiments, the service interface 104 can automatically trigger an execution request, for example after a certain amount of time has passed or based on other data.

In the example operation 306, in response to the execution request, the service interface 104 can transmit data to the service orchestrator 106. For example, the service interface 104 can send code from one or more code sections to the service orchestrator 106, and the service interface 104 can send other information to the service orchestrator 106, such as selected execution environments for code sections, parameters of selected execution environments, metadata about the user or a project, and other data that the service orchestrator 106 may use. The parameters of the selected execution environment may include one or more computer resources that the user wants access to in the selected execution environment. In some examples, such as the example of FIG. 3, the service interface 104 can send all the sections of code at one time to the service orchestrator 106;

in other examples, which are not illustrated, the service interface 104 can send code sequentially, for example by waiting to receive output from one code section before sending another code section.

In the example operation 308, the service interface 104 can receive output data from the service orchestrator 106. As further described above and below, the output data can depend on the code of the code sections, and the output data can be text, images, figures, or another type of data. In example operation 310, the service interface 104 can then display the output data in one or more of the output fields 212*a-c*. In some examples, the display may be a graphical representation of aspects of the output data. Furthermore, in some embodiments, the service interface 104 may display a first aspect of the output data in a first region and a second aspect of the output data in a second region.

In the example operation 312, the service interface 104 can determine whether there is another code section. For example, referring now to the example of FIG. 2A, the service interface 104, after receiving and displaying output data in output field 212*a*, can determine that there is output data from code section 210*c*, and the service interface can receive that output data (e.g., returning to operation 308). If, however, there is no more output data from any of the code sections (e.g., after having displayed data in the output field 212*c*), then the service interface can finish the execution in example operation 314. By finishing the execution, the service interface 104 can, in some embodiments, receive more input, such as code, and it can again execute the method 300.

Figure 4:
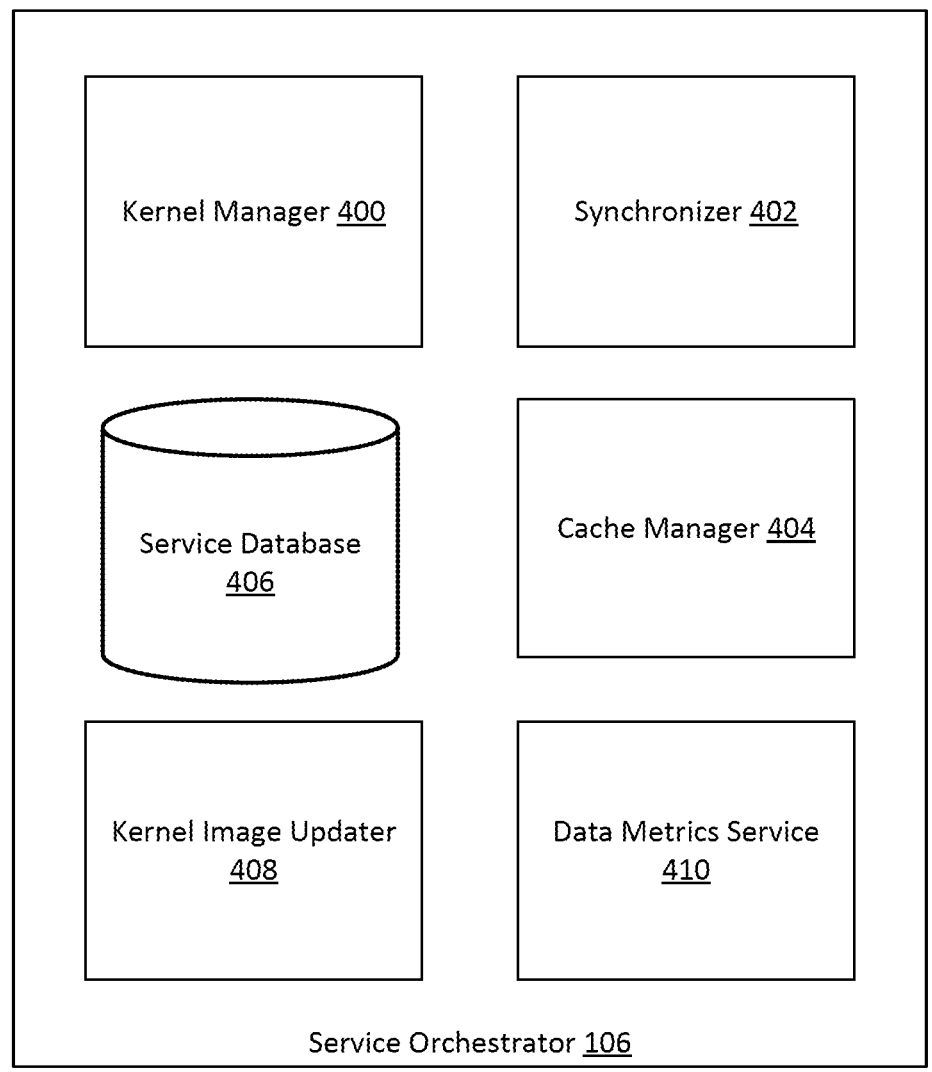
FIG. 4 illustrates a block diagram of an example implementation of an orchestrator.

FIG. 4 illustrates a block diagram depicting components of an example implementation of the service orchestrator 106 of FIG. 1. As described above, the service orchestrator 106 can be part of the service 102, and it can be communicatively coupled with the service interface 104, other example user programs, and the plurality of kernels 108*a-x*. In the example shown, the components of the service orchestrator 106 include a kernel manager 400, a synchronizer 402, a cache manager 404, a service database 406, a kernel image updater 408, and a data metrics service 410. When performing the example methods of FIGS. 5-6, which are further described below, the service orchestrator 106 can use one or more of the components described in connection with FIG. 4. In some examples, each of the components of the service orchestrator 106 can be communicatively coupled with one or more other components of the service orchestrator 106. Depending on the embodiment, there can be more or fewer components than those shown in the example of FIG. 4

In the example shown, the kernel manager 400 can, among other things, determine which kernel of the kernels 108*a-x* to send a particular code section to. For example, as described above, a user can select that a code section of the service interface 104 be executed in a particular execution environment, and the user may also select parameters of the selected execution environment. The kernel manager 400 can determine which kernel of kernels 108*a-x* corresponds with that environment and transmit the code section to that kernel. In some examples, the kernel manager 400 can determine, based on the code itself, which kernel to execute a section of code. Furthermore, the kernel manager 400 can, in some embodiments, after having selected a kernel for a code section, determine whether the kernel is busy or available, and determine whether the service orchestrator 106 must wait (e.g., because of a dependency or an unavailable kernel) to send the code section to the kernel. In some embodiments, the kernel manager 400 may use data of the kernel image updater 408 to track which kernels are coupled with the service orchestrator 106.

In some embodiments, the kernel manager 400 may open a web socket to communicate with a kernel. Furthermore, in some embodiments, the kernel manager 400 may call an API exposed by the kernel, or the kernel manager 400 may, in some instances, send communications via SSH. In some embodiments, the kernel manager 400 may perform more operations with respect to kernels other than just sending code to the kernels for execution. For example, the kernel manager 400 may start a kernel and define the execution environment in which the kernel operates. In some instances, the kernel manager 400 may, when starting up a kernel, provide the kernel with data related to a previous state of the kernel, such as previous data received or generated by the kernel, previous software packages used by the kernel, or previous operations performed by the kernel. To do so, the kernel manager 400 may, in some embodiments, access data of the cache manager 404 related to the kernel. By providing such data to a kernel when starting the kernel, the kernel manager 400 and the service orchestrator 106 may persist kernel memory across subsequent code executions and across kernel restarts. Furthermore, the kernel manager 400 may perform other lifecycle management operations with respect to the kernel, such as stopping the kernel, altering kernel resources or parameters, pinging the kernel, receiving errors from the kernel, or performing other operations.

In some embodiments, the kernel manager 400 can change the order in which code sections are executed by the kernels depending on information received form the user program, on dependencies written into the code, or on other information. In some embodiments, the kernel manager 400 can receive data from the synchronizer 402 or the cache manager 404 that can be sent to kernels as part of a code section execution. For example, if a code section includes operations on a certain set of data, and that set of data was generated from a previous code section, or was generated from a previous execution request, then the kernel manager 400 can receive that set of data set from the synchronizer 402 or the cache manager 404.

In some embodiments, the synchronizer 402 can synchronize output from the kernels 108*a-x*. For example, when there is a plurality of code sections to be executed in different kernels, and where each kernel can output data after executing the code, the synchronizer 402 can receive a plurality of outputs from a plurality of kernels and combine, alter, or store them, as is required depending on the code and the embodiment. In some examples, once the synchronizer 402 has synchronized data output from one or more of the kernels 108*a-x*, then the data can be sent to the service interface 104. In some examples, the synchronizer 402 can send data to the kernel manager 400, and the kernel manager 400 can use that data when interfacing with kernels, as described above. In some embodiments, the synchronizer 402 can also communicate with the cache manager 404 to retrieve data from current or previous executions of code sections, and the synchronizer 402 can use such data when synchronizing kernel output data.

In some embodiments, the cache manager 404 can manage data recently received from one or more of the kernels 108*a-x* or the service interface 104. For example, if a user submits a first execution request, and the service 102 performs the first execution request, then the cache manager 404 can store the code and the output data from that execution request. Thus, in some examples, if the user submits a second execution request without changing certain aspects of the code, then the service 102 can select the output data corresponding to the unaltered code from the cache manager 404 without sending the code to the kernels 108a-x. Additionally, in some embodiments, the cache manager 404 can store data useable by the kernel manager 400 for interfacing with kernels and by the synchronizer 402 for synchronizing output data. For example, in some embodiments, the cache manager 404 can manage data involved in dependencies between code sections. To store data, the cache manager 404 can use the service database 406 or another data storage means. In some embodiments, the cache manager 404 may interface with the cache 118 of FIG. 1 to persist kernel memory.

In some embodiments, the service database 406 can store data received from the service interface 104, received from one or more of the kernels 108a-x, or generated by the service 102. For example, the service database 406 can store code input at the service interface 104, output data generated by the one or more kernels 108a-x, or data generated by, or related to, one or more components of the service orchestrator 106.

The kernel image updater 408 may maintain a list of kernels that are offered to users. The kernel image updater 408 may also include one or more versions of the kernels offered to the users. In some embodiments, the kernel image updater 408 may provide data related to available kernels and execution environment characteristics to a user program. For instance, referring now to FIG. 2B, the kernel image updater 408 may provide to the user program a list of preconfigured execution environments, and the kernel image updater 408 may provide various options for the input fields 213-223 that a user may select.

The data metrics service 410 may receive information from one or more of the kernels 108a-x. For example, the kernels may send data to the data metrics service 410 related to resource utilization, package installation, performance metrics, or other data related to the kernels. In some embodiments, the data metrics service 410 may perform operations on the data received by the kernels to provide diagnostic data to an administrator of the service 102 or the kernels 108a-x. In some embodiments, the data metrics service 410 may provide data to an analytics system that is separate from the service 102.

Figure 5:
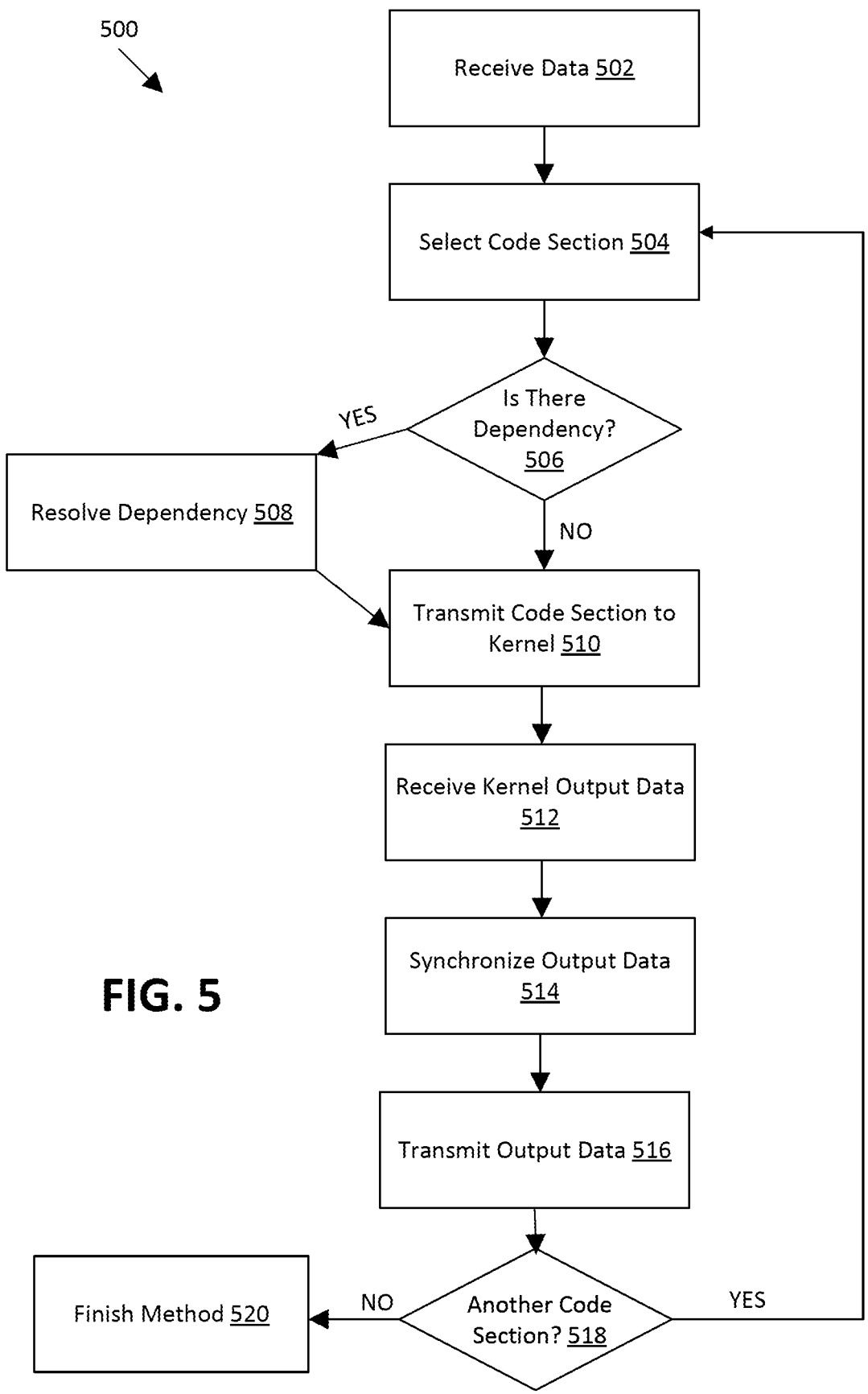
FIG. 5 is a flowchart of an example method useable by an orchestrator.

FIG. 5 is a flowchart of an example method 500 useable, for example, by the service orchestrator 106. In the example of FIG. 5, the service orchestrator 106 is described as interacting with the service interface 104. In other examples, however, the service orchestrator 106 may perform the method 500 while interacting with another user program.

In the example operation 502, the service orchestrator 106 can receive data from, for example, the service interface 104. For example, the service interface 104 can, in response to an execute request, send one or more code sections, one or more execution environment selections, one or more execution environment parameters (e.g., one or more selected computer resources), and other data to the service orchestrator 106.

In the example operation 504, the service orchestrator 106 can select a code section. For example, the service orchestrator 106 can select a code section of the plurality of code sections received from the service interface 104. There are various ways in which the service orchestrator 106 can select a code section. For example, the service orchestrator 106 can select them in the order they are written in the service interface 104; the service orchestrator 106 can select them based on other information received from the service interface 104; or the service orchestrator 106 can select them based in part on other data, such as whether certain code sections were executed in a previous iteration and were not thereafter altered.

In the example operation 506, the service orchestrator 106 can determine, after selecting a code section, whether the code section has a dependency. For example, as described above, a selected code section may require—as an input—an output from another code section. If so, then the service orchestrator 106 cannot send the code section alone to a kernel, and the service orchestrator 106 must resolve the dependency (e.g., going to operation 508). If, however, the selected code section is not dependent on an output of another code section, or is not otherwise dependent on another unresolved process, then the service orchestrator can transmit it to a kernel (e.g., going to operation 510).

In the example operation 508, the service orchestrator 106 can resolve a code section's dependency. In some embodiments, the service orchestrator 106 can resolve a dependency by using data generated during a previous execution, as described above in connection with the kernel manager 400 and the cache manager 404. Furthermore, in some embodiments, the service orchestrator 106 can wait to send a selected code section to a kernel until the code section that it depends on has been executed and its output data combined with the selected code section. Furthermore, in some embodiments, there are other ways to resolve dependencies.

In the example operation 510, the service orchestrator 106 can transmit the selected code section to a kernel. As described above, each kernel of the kernels 108a-x can be configured to execute a certain type of code (e.g., code written in a particular language or with particular dependencies) and can be executing in an execution environment that includes certain hardware, software, and data. To select a kernel to send the selected code section to, the service orchestrator 106 can, for example, select the kernel specified by a user in the service interface 104, select a kernel based on properties of the code section, select a kernel based on constraints of the kernel or based on constraints of the selected code, or select a kernel based on other data. Having selected a kernel, the service orchestrator 106 can verify that the selected kernel is available and can then send the selected code section to it. In some embodiments, the service orchestrator 106 can send a plurality of code sections to a plurality of kernels before receiving any output data from the kernels, thereby allowing the kernels to execute code in parallel; in other embodiments, however, the service orchestrator 106 can wait to send a code section to a kernel until the service orchestrator 106 has received output data from a previous kernel, resulting in sequential code execution; in yet other embodiments, the service orchestrator 106 can send code sections to the kernels for a mix of sequential and parallel execution, depending, for example, on the code sections, the kernels, code section dependencies, or other factors.

In the example operation 512, the service orchestrator 106 can receive output data from the selected kernel. For example, the selected kernel can execute the selected code section and return output data, which can be received by the service orchestrator 106. The data can be, for example, text, data in the form of a table, figure, or chart, or any other data resulting from, or related to, the execution of the selected code section.

In the example operation 514, the service orchestrator 106 can synchronize the output data. For example, when there is a plurality of code sections, each resulting in a plurality of outputs and the outputs come from different kernels, the service orchestrator 106 can receive output data from a kernel (e.g., at operation 512) and can synchronize that output data with other output data. The way in which the code is synchronized can depend on the format of the output data, on the code of the code sections, and on other technical requirements. Furthermore, in some embodiments, the service orchestrator 106 can synchronize the output data with cached data or other data.

In the example operation 516, the service orchestrator 106 can transmit the output data to the service interface 104. The service interface 104 can then, as described above, display the output data in one or more output fields. In some embodiments, the service orchestrator 106 can also transmit the output data to a different location, for example to the database 114 or to a different location. As part of the output data, the service orchestrator 106 can also send other data, including metadata or data related to the kernel that produced that output data.

In the example operation 518, the service orchestrator 106 can determine whether there is another code section. For example, in some embodiments, the service interface 104 can send a plurality of code sections to the service orchestrator 106 and the service orchestrator 106 can, as described above, send the code sections sequentially to the kernels. In such embodiments, for example, the service orchestrator can determine whether there is another code section that has not yet been sent to a kernel for execution, and if so, the service orchestrator can select that code section (e.g., returning to operation 504). If, however, the service orchestrator 106 determines that no more code sections need to be executed, then the service orchestrator can finish the method 500 (e.g., going to operation 520). In the example shown, the service orchestrator 106, when finishing the method 500 in operation 520, can store and manage data received and generated during the method 500, and can then be configured to receive more data from the service interface 104.

Figure 6:
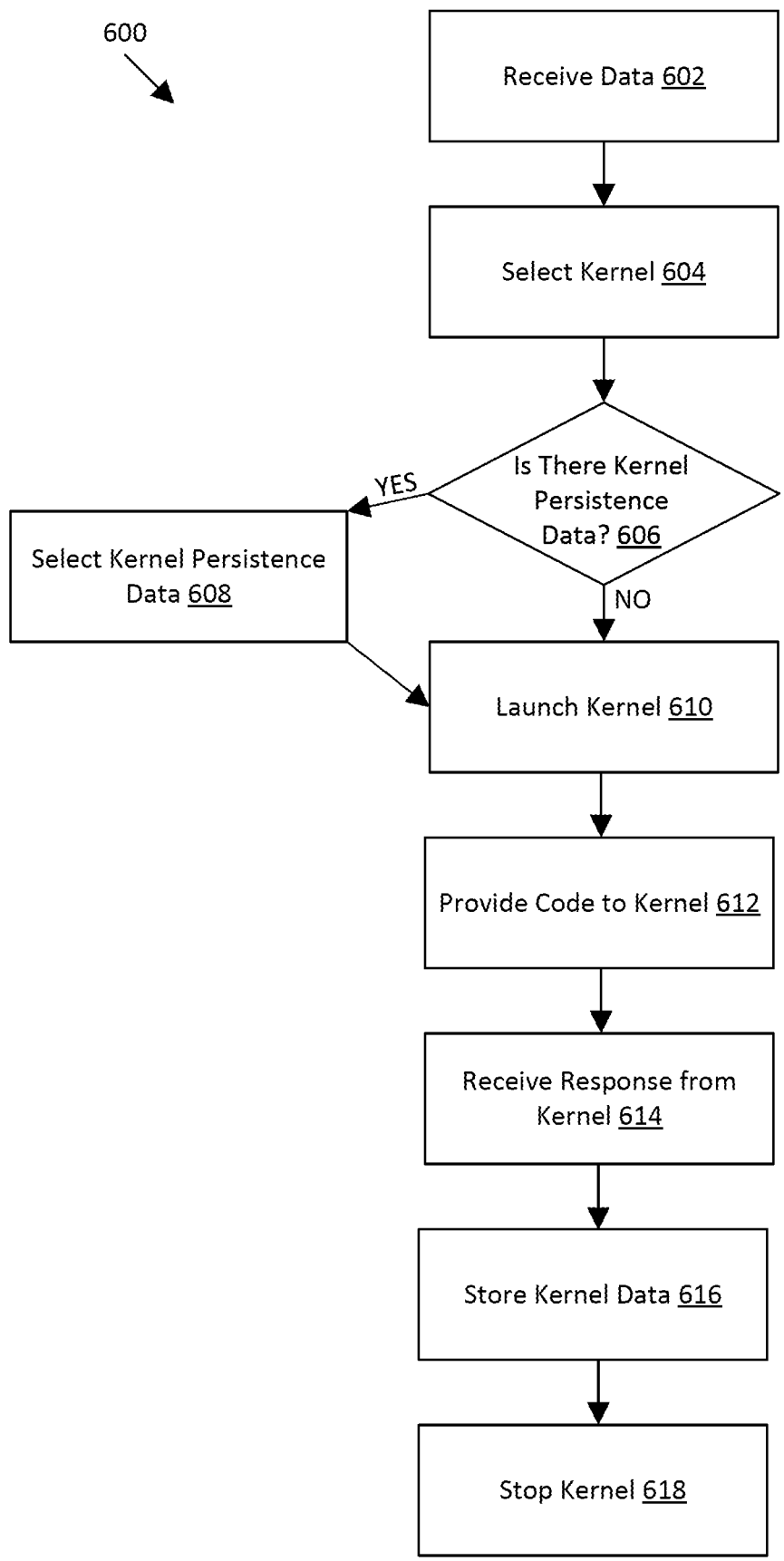
FIG. 6 is a flowchart of an example method useable by an orchestrator.

FIG. 6 is a flowchart of an example method 600 useable, for example, by the service orchestrator 106. The service orchestrator 106 may, in some instances perform operations of the example method 600 in addition to performing operations of the method 500.

In the example operation 602, the service orchestrator 106 may receive data from a user program. The data may include, for example, code to be executed by a selected kernel that is communicatively coupled to the service orchestrator 106. Furthermore, the data may include one or more parameters related to the execution environment in which the kernel is to execute the code.

In the example operation 604, the service orchestrator may select, from a plurality of kernels, the kernel to execute code received at the operation 602. As described above, the service orchestrator 106 may include a kernel image updater 408 that may keep a list of kernels with which the service orchestrator 106 is connected and a configuration for the kernels. In some embodiments, the service orchestrator 106 may select the kernel from the list of kernels. Furthermore, in some embodiments, if a user has defined a custom execution environment for a kernel, then the service orchestrator 106 may generate a new configuration file and store it in the kernel image updater 408.

In the example decision 606, the service orchestrator 106 may determine whether there is persistence data related to the selected kernel. Persistence data may include data related to a previous instance of the kernel, such as a previous configuration of the kernel, previous data generated or received by the kernel, or other data associated with the kernel. For example, the service orchestrator 106 may determine whether there is kernel persistence data in one or more of the database 114 or the cache 118 of FIG. 1. In response to determining that there is persistence data for the kernel (e.g., taking the "YES" branch), the service orchestrator 106 may proceed to select the data at the example operation 608. After selecting kernel persistence data, the service orchestrator 106 may proceed to the example operation 610. In response to determining that there is no such data (e.g., taking the "NO" branch), the service orchestrator 106 may proceed the example operation 610.

In the example operation 610, the service orchestrator 106 may launch the selected kernel. In some embodiments, the service orchestrator 106 may open a web socket to communicate with the selected kernel. In some embodiments, the steps taken by the service orchestrator 106 to launch the kernel may depend on characteristics of the kernel. For example, the process for launching the kernel may depend on the execution environment of the kernel, including the infrastructure in which the kernel resides. For example, for some kernel infrastructures, the service orchestrator 106 may call an API to launch the kernel. For others, the service orchestrator 106 may itself deploy the kernel (e.g., the service orchestrator 106 may deploy a container running a virtual machine that includes the kernel). In some embodiments, the service orchestrator 106 may, irrespective of how the service orchestrator 106 launches the kernel, provide the kernel with persistence data related to the kernel as part of launching the kernel. As a result, the kernel may have access to data that it previously generated, thereby reducing redundant computations, and the kernel may be quickly configured to match previous instances, thereby reducing the time and computational resources required to launch the kernel.

In the example operation 612, the service orchestrator 106 may provide code to the selected kernel. In some embodiments, the service orchestrator 106 may perform one or more of the steps of the method 500 as part of providing code to the selected kernel.

In the example operation 614, the service orchestrator 106 may receive a response from the selected kernel. The response from the selected kernel may include output data generated by the selected kernel. In some embodiments, the service orchestrator 106 may perform one or more of the operations of the method 500 as part of receiving a response from the selected kernel.

In the example operation 616, the service orchestrator 106 may store kernel data. For example, the service orchestrator 106 may store data related to the configuration of the kernel or execution environment of the kernel. As another example, the service orchestrator 106 may store one or more of the data provided to or received from the kernel. As another example, the service orchestrator 106 may store metadata related to the kernel. In some embodiments, the kernel data stored by the service orchestrator 106 may be kernel persistence data for the kernel if it is called again at a later time. In some embodiments, the service orchestrator 106 may store the data in one or more of the database 114, the cache 118, or the service database 406.

In the example operation 618, the service orchestrator 106 may stop the selected kernel. In some embodiments, the process for stopping the selected kernel may depend on characteristics of the kernel, including the infrastructure in which it is running. In some instances, the service orchestrator 106 may call an API of the kernel to stop the kernel. In some instances, the service orchestrator 106 may send a command via SSH to a kernel to stop the kernel.

Figure 7:
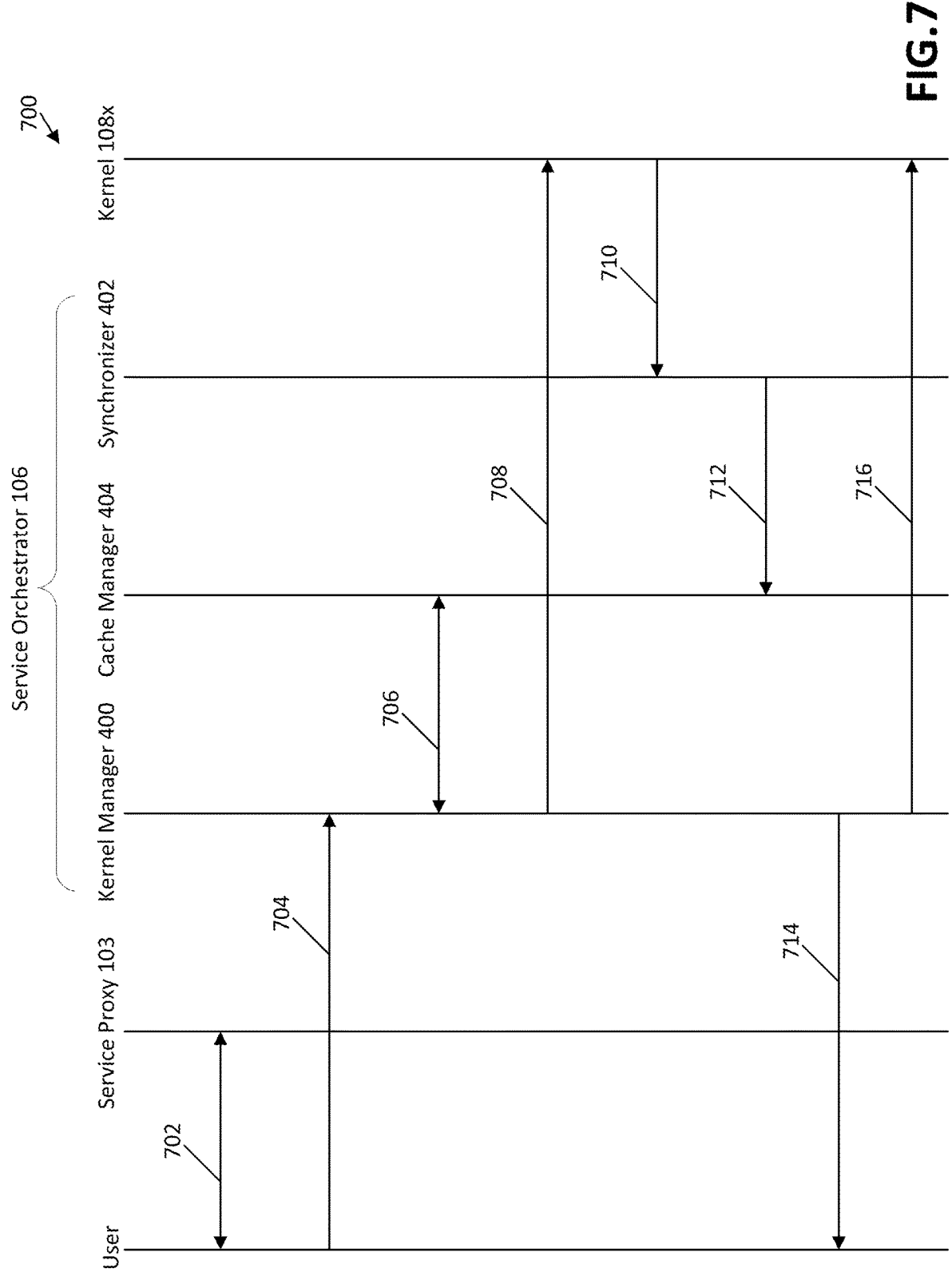
FIG. 7 illustrates an example communication diagram.

FIG. 7 illustrates a communication diagram 700 illustrating example operations of aspects of the present disclosure.

In the example operation 702, the service proxy 103 may perform one or more steps related to authenticating a user (e.g., the user 112a or 112b) that is accessing the service 102. For example, the service proxy 103 may add one or more authorization headers in association with a selected kernel, to control access to the kernel to individual users and/or user groups such that all users are not able to access all currently-instantiated kernels. Rather, only those users authorized to interact with a kernel are able to do so. In some embodiments, the user may provide one or more of login credentials or a certificate to the service proxy 103.

In the example operation 704, the user may provide data to the service orchestrator 106. As described above in connection with FIGS. 5-6, the data may include code and a selected execution environment and kernel. Based on the received data, the kernel manager 400 may select a kernel identified by the user. In the example operation 706, the kernel manager 400 may retrieve persistence data related to the selected kernel from the cache manager 404.

In the example operation 708, the kernel manager 400 may launch the selected kernel, which in the example shown, is the kernel 108x. However, in some instances, the service orchestrator 106 may launch a plurality of kernels (e.g., the service orchestrator 106 may launch a plurality of kernels in response to receiving a plurality of code sections from the user program, two or more of which are associated with different execution environments). Furthermore, the kernel manager 400, or another component of the service orchestrator 106, may provide other data to the kernel 108x. For example, as part of launching the kernel 108x, the service orchestrator 106 may provide persistence data to the kernel 108x. Furthermore, once the kernel 108x is launched, the service orchestrator 106 may provide the code to be executed to the kernel 108x.

In the example operation 710, the service orchestrator 106 may receive output data from the kernel 108x. In some embodiments, the service orchestrator 106 may, at the synchronizer 402, synchronize the data received from the kernel 108x with other data, such as previous data received form the kernel 108x or with data received from other kernels. In the example operation 712, the service orchestrator 106 may, using for example the cache manager 404, store data related to the kernel 108x, related to the data provided to the kernel 108, or related to the data received from the kernel 108x in a cache or database. Such data may, in some instances, be used in connection with persisting kernel memory across executions and instances.

In the example operation 714, the service orchestrator 106 may provide output data generated by the kernel 108x to the user. As described above, a user program may, in some instances, display the output data in a graphical user interface. In some embodiments, the user may provide more data (e.g., more code to execute) to the service orchestrator 106, thereby returning, for example, to the operation 704. In the example operation 716, the service orchestrator 106 may, using for example the kernel manager 400, stop the kernel 108x. In some embodiments, the service orchestrator 106 may automatically stop the kernel 108x in response to receiving output data from the kernel 108x. In some embodiments, the service orchestrator 106 may automatically stop the kernel 108x in response to determining that the user has finished a session.

Figure 8:
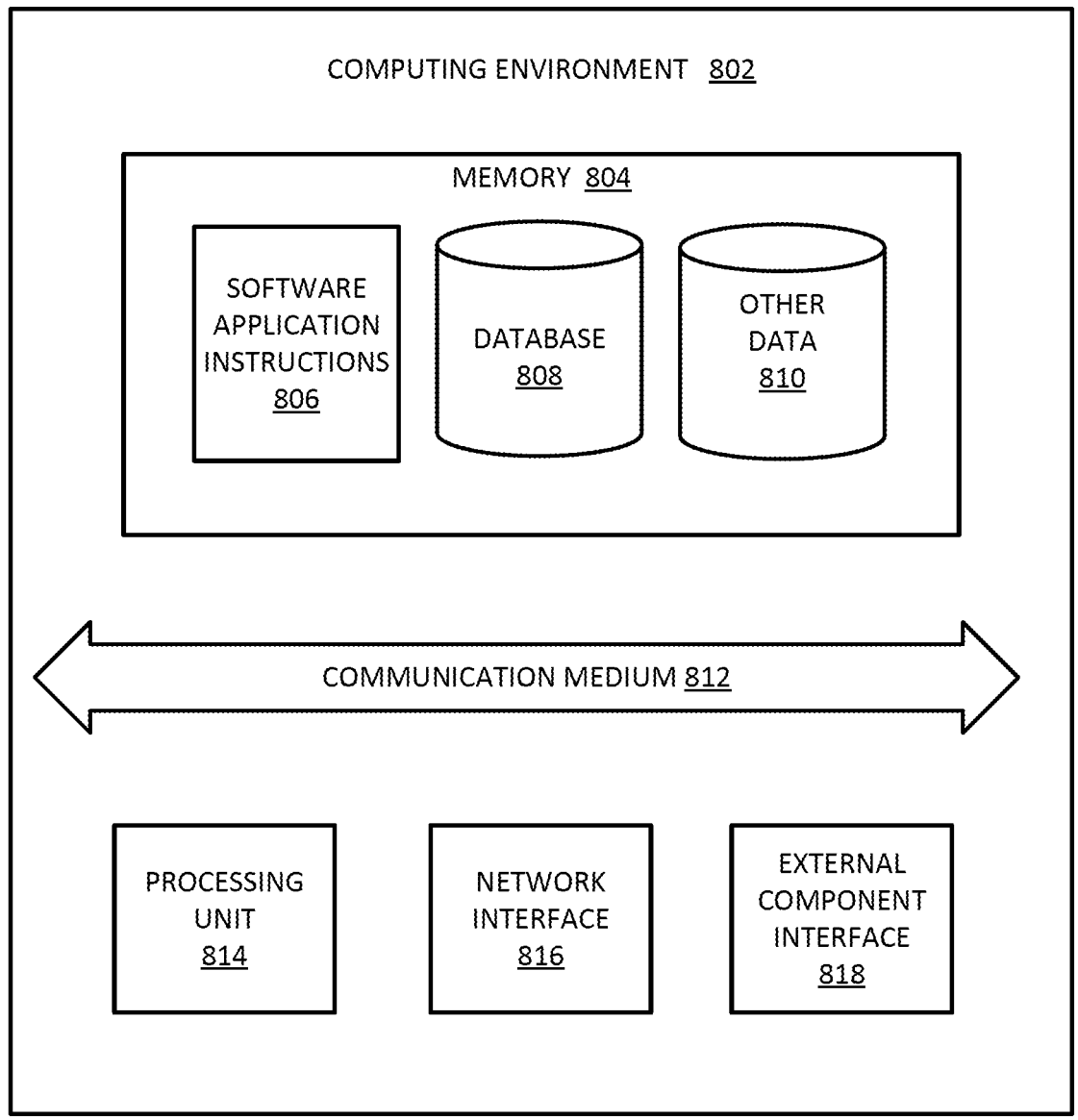
FIG. 8 illustrates an example block diagram of a computing system.

FIG. 8 illustrates an example system 800 with which disclosed systems and methods can be used. In an example, the following can be implemented in one or more systems 600 or in one or more systems having one or more components of system 800: the service 102, the service proxy 103, the service interface 104, the service orchestrator 106, one or more of the kernels 108a-x, one or more of the execution environments 109a-x, the web browser 110, the local IDE 111, the database 114, the cache 118, the kernel manager 400, the synchronizer 402, the cache manager 404, the service database 406, the kernel image updater 408, the data metrics service 410, and any other computing systems disclosed herein.

In an example, the system 800 can include a computing environment 802. The computing environment 802 can be a physical execution environment, a virtualized execution environment, or a combination thereof. The computing environment 802 can include memory 804, a communication medium 812, one or more processing units 814, a network interface 816, and an external component interface 818.

The memory 804 can include a computer readable storage medium. The computer storage medium can be a device or article of manufacture that stores data and/or computer-executable instructions. The memory 804 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 804 can store various types of data and software. For example, as illustrated, the memory 804 includes software application instructions 806, one or more databases 808, as well as other data 810.

The communication medium 812 can facilitate communication among the components of the computing environment 802. In an example, the communication medium 812 can facilitate communication among the memory 804, the one or more processing units 814, the network interface 816, and the external component interface 818. The communications medium 812 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 814 can include physical or virtual units that selectively execute software instructions, such as the software application instructions 806. In an example, the one or more processing units 814 can be physical products comprising one or more integrated circuits. The one or more processing units 814 can be implemented as one or more processing cores. In another example, one or more processing units 814 are implemented as one or more separate microprocessors. In yet another example embodiment, the one or more processing units 814 can include an application-specific integrated circuit (ASIC) that provides specific functionality. In yet another example, the one or more processing units 814 provide specific functionality by using an ASIC and by executing computer-executable instructions.

The network interface 816 enables the computing environment 802 to send and receive data from a communication network (e.g., the networks 116*a*-*c*). The network interface 816 can be implemented as an Ethernet interface, a token-ring network interface, a fiber optic network interface, a wireless network interface (e.g., Wi-Fi), or another type of network interface.

The external component interface 818 enables the computing environment 802 to communicate with external devices. For example, the external component interface 818 can be a USB interface, Thunderbolt interface, a Lightning interface, a serial port interface, a parallel port interface, a PS/2 interface, or another type of interface that enables the computing environment 802 to communicate with external devices. In various embodiments, the external component interface 818 enables the computing environment 802 to communicate with various external components, such as external storage devices, input devices, speakers, modems, media player docks, other computing devices, scanners, digital cameras, and fingerprint readers.

Although illustrated as being components of a single computing environment 802, the components of the computing environment 802 can be spread across multiple computing environments 802. For example, one or more of instructions or data stored on the memory 804 may be stored partially or entirely in a separate computing environment 802 that is accessed over a network. Depending on the size and scale of the computing environment 802, it may be advantageous to include one or more load balancers to balance traffic across multiple physical or virtual machine nodes.

Aspects of the system 800 and the computing environment 802 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full system 800, such that portal can run and schedule jobs and serve the portal user interface as long as a single node remains functional. The environment 802 may include monitoring technology to determine when a node is not functioning so an appropriate action can be taken.

Referring to FIGS. 1-8 generally, it is noted that the present disclosure has a number of advantages over existing data analysis frameworks and tools. For example, the flexible deployment of execution environments allows end-users to avoid having to manually sub-segment data into collections that may fit within existing/available execution environments, analyze those sub-segments, and then recombine/synthesize that analysis. Additionally, end users may prefer specialized environment features (e.g., specific platform or kernel characteristics, such as a local IDE), and may instantiate an execution kernel environment that satisfies that need. Especially in the case of ad-hoc data analysis workloads, this flexibility may significantly decrease the time required by data scientists or other personnel in creating appropriate execution environments and infrastructures that support their desired data analysis projects, allowing them to focus on data analysis tasks without worry that such tasks will not adequately be managed within available computing resources.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system for distributing code execution comprising:
an orchestrator; and
a user program communicatively coupled to the orchestrator;
wherein the orchestrator comprises:
a processor; and
memory storing instructions that, when executed by the processor, cause the orchestrator to:
receive a first code section and a second code section from the user program;
receive, from the user program, a first selected execution environment, the first selected execution environment selected based on a first user selection from a plurality of execution environments listed on a user interface, the first selected execution environment including a first kernel for executing the first code section using a first set of computing resources;
receive, from the user program, a second selected execution environment, the second selected execution environment selected based on a second user selection from the plurality of execution environments listed on the user interface, the second selected execution environment including a second kernel for executing the second code section using a second set of computing resources;

transmit the first code section to the first kernel for executing the first code section in the first selected execution environment;

transmit the second code section to the second kernel for executing the second code section in the second selected execution environment;

receive first output data from the first kernel;

receive second output data from the second kernel; and transmit the first output data and the second output data to the user program.

2. The system of claim 1, wherein the instructions, when executed by the processor, further cause the orchestrator to:

receive a plurality of additional code sections from the user program;

receive a plurality of additional selected execution environments;

wherein each additional code section of the plurality of additional code sections corresponds with a corresponding additional execution environment of the plurality of additional selected execution environments;

wherein, for each additional code section of the plurality of additional code sections, the corresponding additional execution environment includes a corresponding additional kernel for executing the additional code section; and transmit, for each additional code section of the plurality of additional code sections, the additional code section to the corresponding additional kernel.

3. The system of claim 1, wherein the first code section and the second code section are written in different programming languages.

4. The system of claim 1, wherein the instructions, when executed by the processor, further cause the orchestrator to synchronize the first output data and the second output data.

5. The system of claim 1, wherein the instructions, when executed by the processor, further cause the orchestrator to resolve a dependency between the first code section and the second code section; and wherein transmitting the first code section to the first kernel and transmitting the second code section to the second kernel is performed after resolving the dependency between the first code section and the second code section.

6. The system of claim 1, wherein the first set of computer resources and the second set of computer resources are both user selected from a plurality of computer resource options on the user interface, the first set of computer resources and the second set of computing resources being one or more of a selected memory, a selected computing power, or a selected software package.

7. The system of claim 1, wherein the user interface of the user program includes a plurality of display regions, wherein each of the plurality of display regions comprises:

a first code input field for receiving the first code section;

a second code input field for receiving the second code section;

a first execution environment selection field for selection the first execution environment in which to execute the first code section; and a second execution environment selection field for selecting the second execution environment in which to execute the second code section.

8. The system of claim 1, wherein the user program is an integrated development environment.

9. The system of claim 1, wherein the system further comprises a web-based software development program communicatively coupled to the orchestrator; and wherein the user program is a web browser communicatively coupled to the web-based software development program.

10. The system of claim 1, wherein transmitting the first output data to the user program causes the user program to display a first graphical representation of the first output data and transmitting the second output data to the user program causes the user program to display a second graphical representation of the second output data.

11. The system of claim 1, wherein the instructions, when executed by the processor, further cause the orchestrator to, prior to transmitting the first code section to the first kernel, launch the first kernel and prior to transmitting the second code section to the second kernel, launch the second kernel.

12. The system of claim 1, wherein the instructions, when executed by the processor, further cause the orchestrator to:

store persistence data related to the first kernel and the second kernel; and stop the first kernel and the second kernel.

13. A method for distributing code execution, the method comprising:

receiving a first code section and a second code section from a software development program;

receiving, from the software development program, a first execution environment and a second execution environment, the first execution environment including a first kernel for executing the first code section and the second execution environment including a second kernel for executing the second code section;

transmitting the first code section to the first kernel for executing code of the first code section in the first execution environment;

transmitting the section code section to the second kernel for executing code of the second code section in the second execution environment;

receiving first output data from the first kernel and second output data from the second kernel; and transmitting the first output data and the second output data to the software development program.

14. The method of claim 13, further comprising, after receiving the first output data from the first kernel and the second output data from the second kernel, synchronizing the first output data and the second output data.

15. The method of claim 13, wherein transmitting the first code section to the first kernel and the second code section to the second kernel comprises resolving a dependency for at least one of the first code section or the second code section.

16. The method of claim 13, wherein transmitting the first output data and the second output data to the software development program causes the software development program to:

display a first aspect of the first output data in a first region associated with the first code section; and display a second aspect of the second output data in a second region associated with the second code section.

17. The method of claim 13, further comprising, prior to transmitting, the first code section to the first kernel and the second code section to the second kernel:

retrieving first kernel persistence data for the first kernel and second kernel persistence data for the second kernel;

launching the first kernel, wherein launching the first kernel comprises sending the first kernel persistence data to the first kernel; and launching the second kernel, wherein launching the second kernel comprises sending the second kernel persistence data to the second kernel.

18. The method of claim 13, wherein the software development program comprises a service interface accessed by a web browser.

19. A non-transitory computer readable medium, having stored instructions thereon, which when executed by a processor, cause the processor to distribute code execution by performing a method comprising:

receiving a first code section and a second code section from a user program;

receiving, from the user program, a first selected execution environment and a second selected execution environment from a plurality of execution environments, the first selected execution environment including a first kernel for executing the first code section and the second selected execution environment including a second kernel for executing the second code section;

transmitting the first code section to the first kernel for executing the first code section in the first selected execution environment;

transmitting the second code section to the second kernel for executing the second code section in the second selected execution environment;

receiving first output data from the first kernel and second output data from the second kernel; and transmitting the first output data and the second output data to the user program.

\* \* \* \* \*